(12) United States Patent
Bloch et al.

(10) Patent No.: US 6,922,408 B2
(45) Date of Patent: Jul. 26, 2005

(54) PACKET COMMUNICATION BUFFERING WITH DYNAMIC FLOW CONTROL

(75) Inventors: Noam Bloch, Bat Shlomo (IL); Freddy Gabbay, Tel Aviv (IL); Michael Kagan, Zichron Yaacov (IL); Alon Webman, Kiryat Ono (IL); Diego Crupnicoff, Haifa (IL)

(73) Assignee: Mellanox Technologies Ltd., Yokneam (IL)

( * ) Notice: Subject to any disclaimer, the term of this patent is extended or adjusted under 35 U.S.C. 154(b) by 650 days.

(21) Appl. No.: 09/758,029

(22) Filed: Jan. 10, 2001

(65) Prior Publication Data

US 2001/0043564 A1 Nov. 22, 2001

Related U.S. Application Data

(60) Provisional application No. 60/175,339, filed on Jan. 10, 2000.

(51) Int. Cl.$^7$ ............................................. H04L 12/28
(52) U.S. Cl. ....................................... 370/389; 370/412
(58) Field of Search ................................ 370/229–235, 370/235.1, 236, 236.1, 236.2, 241, 242, 244, 253, 389, 395.1, 397, 399, 395.2, 365.21, 395.3, 395.4, 395.41, 412–418, 438, 443, 458, 468, 477; 710/100, 107, 111, 112, 113, 117, 129, 121

(56) References Cited

U.S. PATENT DOCUMENTS 6,324,165 B1 * 11/2001 Fan et al. ................... 370/232

OTHER PUBLICATIONS

Stallings, ISDN and Broadband ISDN with Frame Relay and ATM, 1999, Prentice Hall, PP:460–464.*
Gelenbe, Erol; Bandwidth Allocation and Call admission Control in High–Speed Networks, 1997, IEEE, PP122–129.*
Infiniband™ Architecture Release 1.0, vol. 1, section 7.9, Oct. 24, 2000, pp. 175–179.

* cited by examiner

Primary Examiner—David Vincent
(74) Attorney, Agent, or Firm—Mark M. Friedman (57) ABSTRACT

A method for link-level flow control includes establishing a plurality of logical links over a physical link between a transmitting entity and a receiving entity in a network. Respective maximum limits of transmission credits are assigned to the logical links, the credits corresponding to space available to the links in a dynamically allocable portion of a receive buffer at the receiving entity, such that a sum of the maximum limits for all of the logical links corresponds to an amount of space substantially larger than a total volume of the space in the dynamically allocable portion of the receive buffer. Responsive to traffic from the transmitting entity to the receiving entity on a given one of the logical links, one or more of the credits are allocated to the given logical link when it is determined that a total of the credits allocated to the given logical link is no greater than the respective maximum limit, and that a total of the credits allocated to all of the logical links together corresponds to an allocated volume that is no greater than the total volume of the space in the dynamically allocable portion of the receive buffer. Transmission of data over the given logical link is controlled responsive to the allocated credits.

8 Claims, 5 Drawing Sheets

PACKET COMMUNICATION BUFFERING WITH DYNAMIC FLOW CONTROL

CROSS-REFERENCE TO RELATED APPLICATIONS

This application claims the benefit of U.S. Provisional Patent Application No. 60/175,339, filed Jan. 10, 2000, which is incorporated herein by reference.

FIELD OF THE INVENTION

The present invention relates generally to digital network communications, and specifically to flow control in a computer switching fabric.

BACKGROUND OF THE INVENTION

The computer industry is moving toward fast, packetized, serial input/output (I/O) bus architectures, in which computing hosts and peripherals are linked by a switching network, commonly referred to as a switching fabric. A number of architectures of this type have been proposed, culminating in the "InfiniBand™" (IB) architecture, which has been advanced by a consortium led by a group of industry leaders (including Intel, Sun Microsystems, Hewlett Packard, IBM, Compaq, Dell and Microsoft). The IB architecture is described in detail in the InfiniBand Architecture Specification, Release 1.0, which is available from the InfiniBand Trade Association at www.infiniband-ta.org and is incorporated herein by reference.

InfiniBand uses an "absolute," credit-based link-level flow control mechanism in order to prevent loss of packets due to buffer overflow by the receivers at either end of a link. This mechanism is described in section 7.9 of the above-mentioned specification (pages 175–179). Any given physical link between two switches in an IB fabric may carry up to fifteen logical links, referred to in IB parlance as "Virtual Lanes" (VLs). The switch port at each end of each physical link includes a transmitter and receiver, for sending packets to and receiving packets from the corresponding port at the other end of the link. The receiver controls packet flow over each of the VLs by providing the transmitter with "credit limits," indicating the total amount of data that the transmitter has been authorized to send. When the credit limit for a given VL has been exhausted, the transmitter is not permitted to send any more data over that VL until it has received a flow control packet from the receiver, indicating that additional credit has become available.

The credit limits are calculated by the receiver in such a manner as to guarantee that there will always be room available in the receive buffer for any packets sent by the transmitter within the applicable credit limits. This means that the receiver must leave an adequate amount of vacant buffer space for every one of the VLs that it serves. In order to maximize utilization of the bandwidth available on the physical link, the receiver preferably updates the transmitter's credit limits continually (and sends the appropriate flow control packets to the transmitter, while the transmitter is transmitting data), rather than waiting until the transmitter has used up its credit limit. It would thus appear that very large buffers are required at all of the switch ports in order to maintain efficient, wire-speed communications throughout the fabric.

SUMMARY OF THE INVENTION

It is an object of some aspects of the present invention to provide improved methods for flow control in a packet switching fabric.

It is a further object of some aspects of the present invention to enhance the efficiency of buffer memory use in switching devices in a packer switching fabric.

Preferred embodiments of the present invention operate in a packet switching fabric, in which each switch typically comprises a plurality of ports, and each port is connected by a physical link to a corresponding port of another switch or of another entity in the fabric. Preferably, the fabric comprises an InfiniBand fabric, but the principles of the present invention are similarly applicable to switching fabrics (or networks) of other types that use credit-based link-level flow control, as described in the Background of the Invention. Each physical link in the network is capable of carrying a plurality off logical links. Each port comprises a transmitter and a receiver. The receiver has a buffer, in which it can hold data packets that it has received over the physical link before passing the packets through the switch to another of the ports for further transmission through the fabric. (When possible, packets are "cut through" the switch from input port to output port without delay, but the buffer is needed in order to deal with congestion and contention for switch and port resources that may occur.) The transmitter transmits packets over a given logical link only when sufficient credits are available on the link.

In preferred embodiments of the present invention, each of the logical links receives a certain guaranteed, static allocation of space in the buffer, while a remainder of the buffer space, beyond what is required for static allocation, is available for dynamic sharing among the logical links. In this way, each of the logical links may receive an additional, spare allocation of buffer space when traffic on the link requires, up to a maximum that is allocated individually for each of the logical links. The total of the maximum spare allocations permitted for all of the logical links is substantially greater than the actual spare buffer space available for sharing. Thus, the relative buffer allocations among the logical links grow and shrink in relation to the respective traffic demands of the links, and the available buffer space is used more efficiently than would be the case if the buffer space were subject only to static allocation.

When sufficient space is available in the receive buffer to receive further packets on a given logical link, the receiver notifies the transmitter at the other end of the physical link that there is transmission credit available on the logical link. In determining whether space is available, the receiver considers two factors: (1) whether this logical link is below its maximum individual allocation of spare buffer space; and (2) whether there is space available in the shared portion of the buffer. The port thus controls the data flow over each of the logical links based on both the traffic demands on that particular logical link and the overall traffic demands on the physical link. This dual flow control mechanism facilitates optimal use of both available buffer space and link bandwidth.

There is therefore provided, in accordance with a preferred embodiment of the present invention, a method for link-level flow control, including:

establishing a plurality of logical links over a physical link between a transmitting entity and a receiving entity in a network;

assigning to the logical links respective maximum limits of transmission credits, the credits corresponding to space available to the links in a dynamically allocable portion of a receive buffer at the receiving entity, such that a sum of the maximum limits for all of the logical links corresponds to an amount of space substantially larger than a total volume of the space in the dynamically allocable portion of the receive buffer;

responsive to traffic from the transmitting entity to the receiving entity on a given one of the logical links, allocating one or more of the credits to the given logical link when it is determined that a total of the credits allocated to the given logical link is no greater than the respective maximum limit, and that a total of the credits allocated to all of the logical links together corresponds to an allocated volume that is no greater than the total volume of the space in the dynamically allocable portion of the receive buffer; and controlling transmission of data over the given logical link responsive to the allocated credits.

Preferably, the method includes allocating to the logical links respective static portions of the receive buffer so as to hold, in each of the static portions, only the data received over the respective link, wherein the dynamically allocable portion of the receive buffer includes the portion of the buffer remaining after allocation of the static portions. Further preferably, allocating the static portions includes, when it is determined that a total of the credits allocated to the given logical link is greater than the respective maximum limit, or that a total of the credits allocated to all of the logical links together corresponds to an allocated volume that is greater than the total volume of the space in the dynamically allocable portion of the receive buffer, allocating the credits to the given logical link corresponding to the space available in the respective static portion of the receive buffer.

Additionally or alternatively, the method includes:

receiving the data in the receive buffer responsive to the allocated credits;

passing the data from the receive buffer for onward transmission through the network; and redistributing the allocated credits, after releasing the data, among the logical links having receive queues in the receive buffer that use both the static and dynamically allocable portions of the buffer.

Preferably, controlling the transmission of data includes withholding transmission if the credits allocated are not sufficient to cover an amount of the data that is to be transmitted.

Preferably, the method includes receiving the data in the receive buffer responsive to the allocated credits, passing the data from the receive buffer for onward transmission through the network, and releasing the allocated credits for use in subsequent transmission of data. Further preferably, releasing the allocated credits includes redistributing the released credits among the plurality of logical links. Most preferably, redistributing the released credits includes distributing the released credits in a round robin among at least some of the logical links. Additionally or alternatively, allocating the one or more of the credits includes allocating the credits from a pool of credits available to the logical links, and wherein releasing the allocated credits includes returning the credits to the pool.

In a preferred embodiment, the network includes a switching fabric, and establishing the plurality of logical links includes establishing virtual lanes in the switching fabric. Preferably, the switching fabric operates in accordance with an InfiniBand specification. Further preferably, controlling the transmission of data includes controlling the transmission of data packets by the transmitting entity. Most preferably, controlling the transmission of the data packets includes sending a flow control packet from the receiving entity to the transmitting entity, informing the transmitting entity of the allocated credits.

There is also provided, in accordance with a preferred embodiment of the present invention, network communication apparatus, including:

a transmitter, adapted to transmit data; and a receiver, coupled to the transmitter by a physical link in the network and adapted to receive the data from the transmitter over a plurality of logical links established by the transmitter and the receiver over the physical link therebetween, the receiver including a receive buffer with respect to which respective maximum limits of transmission credits are assigned to the logical links, the credits corresponding to space available to the links in a dynamically allocable portion of the receive buffer, such that a sum of the maximum limits for all of the logical links corresponds to an amount of space substantially larger than a total volume of the space in the dynamically allocable portion of the receive buffer, the receiver being adapted, responsive to traffic from the transmitting entity to the receiving entity on a given one of the logical links, to allocate one or more of the credits to the given logical link when the receiver determines that a total of the credits allocated to the given logical link is no greater than the respective maximum limit, and that a total of the credits allocated to all of the logical links together corresponds to an allocated volume that is no greater than the total volume of the space in the dynamically allocable portion of the receive buffer, and the transmitter being adapted to control transmission of the data over the given logical link responsive to the allocated credits.

The present invention will be more fully understood from the following detailed description of the preferred embodiments thereof, taken together with the drawings in which:

DETAILED DESCRIPTION OF PREFERRED EMBODIMENTS

Figure 1:
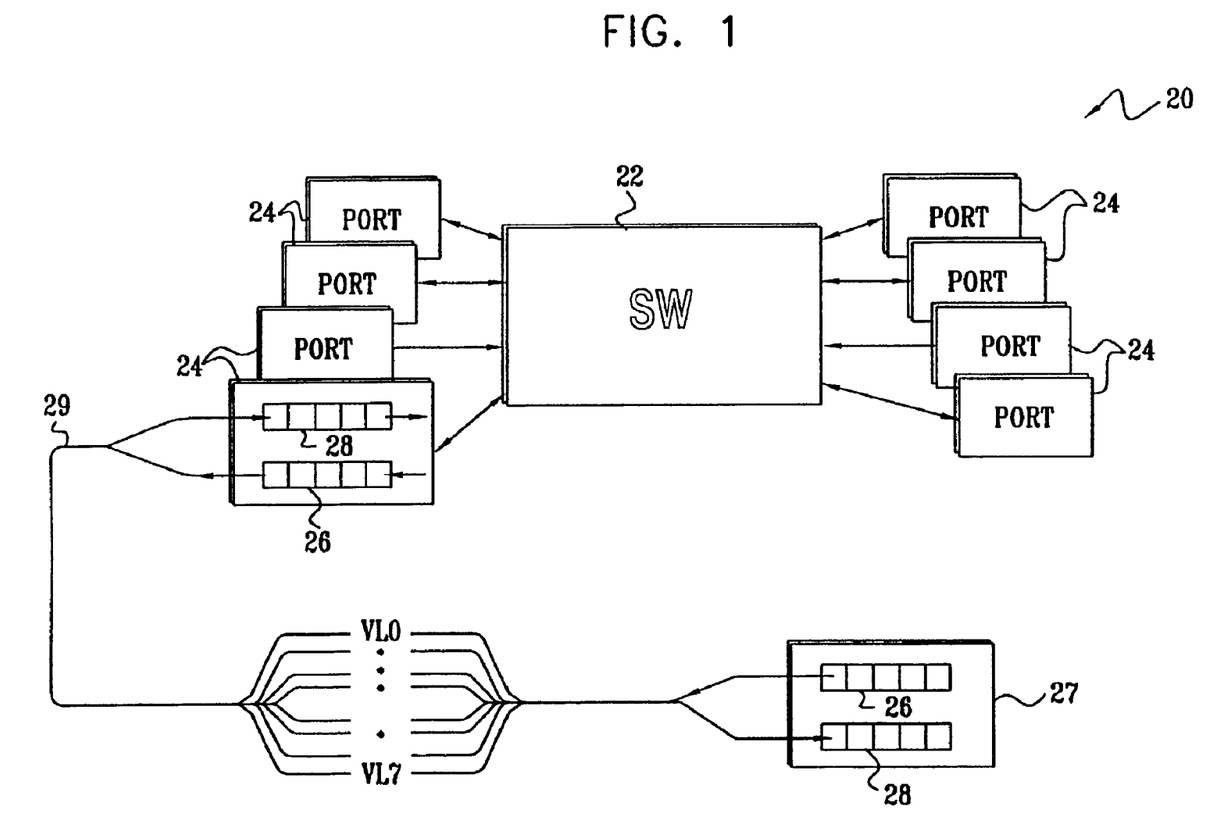
FIG. 1 is a block diagram that schematically illustrates a switch in a packet switching fabric, in accordance with a preferred embodiment of the present invention.

FIG. 1 is a block diagram that schematically illustrates a switch 20 in a packet switching fabric, in accordance with a preferred embodiment of the present invention. Preferably, the fabric comprises an InfiniBand (IB) fabric, operating in accordance with the specification mentioned in the Background of the Invention. Switch 20 comprises a switching core 22 and a plurality of ports 24. The ports comprise transmit queues 26 and receive queues 28, although for simplicity of illustration, details are shown with respect to only one of the ports. This port 24 transmits and receives packets over a full-duplex physical link 29 with another network entity 27, which likewise has queues 26 and 28. Typically, entity 27 comprises a port belonging to another switch, but it may also comprise a network host or peripheral device adapter, or a network device of another type, as is known in the art.

Port 24 and entity 27 are configured to communicate over a plurality of logical links, all of which are carried over physical link 29. In accordance with IB convention, these logical links are referred to as virtual lanes and are labeled VL0, VL1, ..., VL7, indicating that up to eight such logical links are maintained in the present example. Alternatively, a greater or smaller number of lanes may be supported. Typically, when port 24 receives a packet over one of these virtual lanes, it passes the packet through switching core 22 to one of the other ports of switch 20, in accordance with routing tables held in the switch. The other port transmits the packet over one of its own over one of its own virtual lanes, until the packet reaches its final destination.

Figure 2:
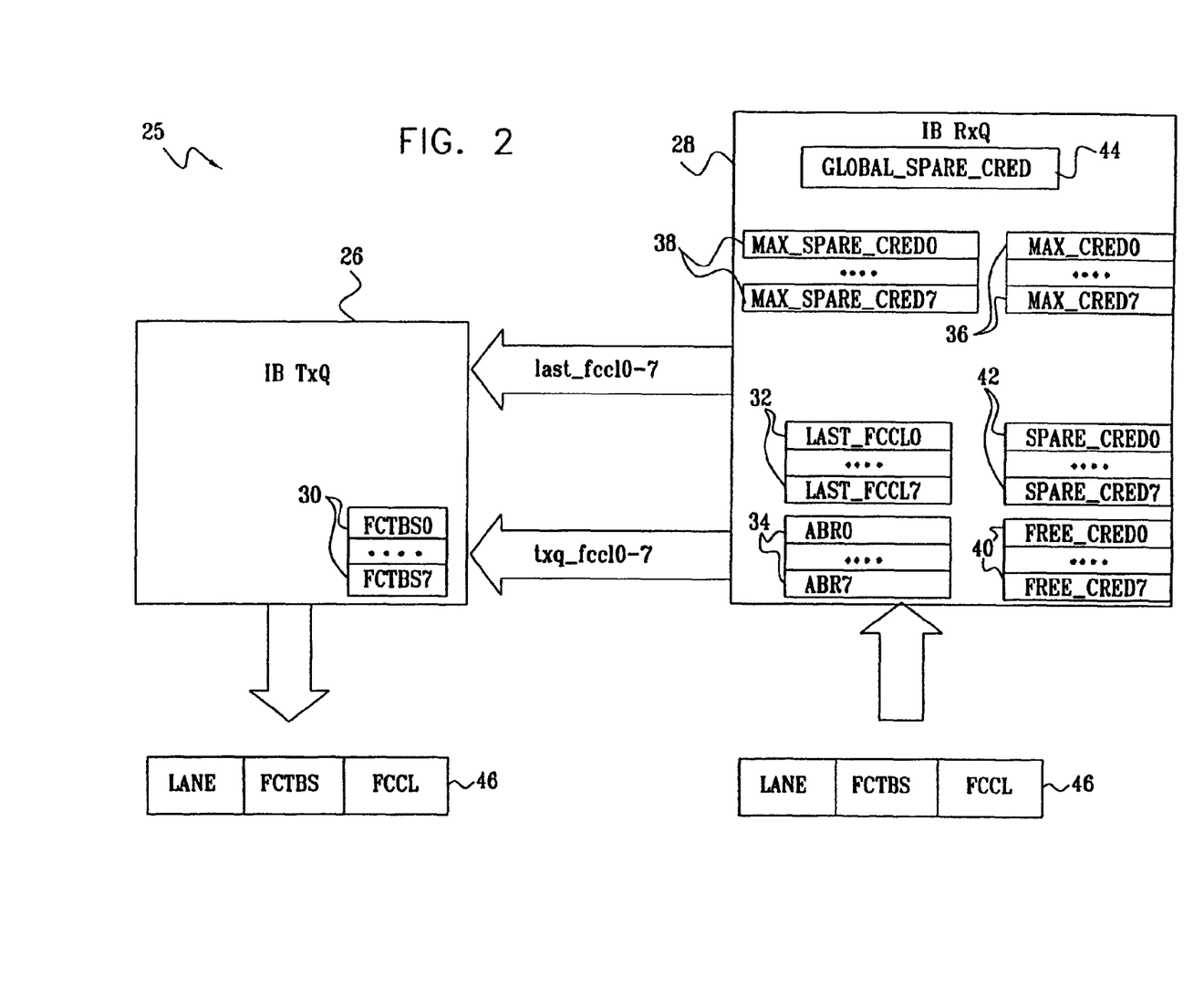
FIG. 2 is a block diagram that schematically illustrates a buffer used in maintaining transmit and receive queues of a port in a packet switching fabric, in accordance with a preferred embodiment of the present invention.

FIG. 2 is a block diagram that schematically shows details of data structures in a buffer 25 in port 24, in accordance with a preferred embodiment of the present invention. A similar structure is preferably maintained in entity 27 and in other entities that communicate over the fabric. The structure of buffer 25 contains transmit. queues 26 and receive queues 28, labeled TxQ and RxQ, respectively. In practice, transmit queues 26 are preferable "virtual queues," in the sense that buffer 25 does not actually hold any packets that are waiting to be sent over link 29. Rather, packets that are received by other ports and destined for transmission over link 29 are either cut through switching core 22 for immediate transmission over the appropriate VL on link 29, or are held in the buffers of the input ports that received them until the desired output port is available for transmission and credits are available on the appropriate VL. In other words, buffer 25 effectively serves as both the receive buffer for this port 24 and as a part of the transmit buffers of the other ports of switch 20.

Buffer 25 typically holds multiple receive queues 28, one for each of the VLs that it serves on link 29. Each receive queue is preferably divided into multiple transmit sub-queues, one for each of the ports to which the incoming packets may be routed through the switch for output. Each queue and sub-queue are preferably maintained in the form of a linked list, wherein a pointer is associated with each packet in the queue of a given VL that is destined for a given output port, pointing to the address of the next packet in the queue that is destined for that port. The linked list structure allows all of the queues to be maintained within the same physical buffer memory space. In other words, while the memory is partitioned logically, with each VL receiving a certain allocation of buffer space, as described further hereinbelow, there is no physical partitioning of the memory among the queues.

In order to control the allocation of buffer space among the VLs, port 24 maintains records of the use of buffer space and other resources by each of the lanes in respective registers. There are eight Flow Control Total Blocks Sent (FCTBS) registers 30 associated with transmit queues 26, one register for each of the VLs, each register preferably 12 bits in length. Each register records the total number of 64-byte data blocks that have been sent over the respective VL, preferably in the form of a modulo 4096 number, as dictated by the IB specification. There are eight Last Flow Control Credit Limit (LAST_FCCL) registers 32 and eight Adjusted Blocks Received (ABR) registers 34 associated with receive queues 28. These registers are similarly 12 bits long and are respectively assigned to the VLs.

Periodically, entity 27 sends a credit packet 46 to port 24 over link 29, indicating the number of data blocks it has sent over a given lane, as recorded in register 30 at entity 27. This value is used to update the corresponding ABR register 34 of port 24, so as to synchronize the states of the transmitter and receiver. Each LAST_FCCL register 32 at port 24 holds a value equal to the content of the corresponding ABR register at entity 27, plus the amount of credit (in blocks) available to the transmitter in receive queue 28 at entity 27 for the respective virtual lane. Thus, by comparing the values in registers 30 and 32 for any given lane, port 24 is able to determine the amount of credit that it has for transmission over that lane. Credit packets 46 sent from port 24 to entity 27 are used by entity 27 in like manner. The operation of these registers in flow control between entity 27 and port 24 is described in greater detail hereinbelow.

Buffer 25 also comprises, for each of the eight VLs, a maximum credit register 36 and a maximum spare credit register 38. The values in these registers are preferably set in software at boot-up of the switching fabric. Register 36 holds a value MAX_CREDn for the respective VL n, indicating the static allocation of credits (i.e., of memory space) in buffer 28 for the receive queue of this VL. This is the baseline, guaranteed credit that is held for this lane, even if the credit is not used. Preferably, for efficient use of buffer 25, the value of MAX_CREDn for each lane is held to the smallest value possible that is compatible with the service level of the particular lane. The sum of the values of MAX_CREDn over all of the lanes should then be considerably smaller than the total size of buffer 25.

The buffer space remaining, over and above the static allocations, is held in a pool of spare credits for dynamic sharing among the virtual lanes. Each register 38 holds a value MAX_SPARE_CREDn for the respective VL, indicating the maximum amount of space in buffer 28 that can be allocated to the lane in the shared portion of the buffer. This allocation is dynamic, in the sense that it is granted (up to the MAX_SPARE_CREDn limit) only when the traffic on the particular lane requires it, and may not be available when the shared space has already been allocated to other lanes. The sum of the values of MAX_SPARE_CREDn over all of the lanes is preferably substantially larger than the total space available in the shared pool. The available quantity of this total shared space remaining, beyond what has been allocated to the VLs, is held in a global spare credit register 44.

To manage the actual allocation of buffer space to each VL, the port receiver maintains free credit registers 40 and spare credit registers 42. The free credit register for each lane holds a value FREE_CREDn indicating the total current unused credit available to the lane. The initial value in this register is MAX_CREDn, and the value then decreases in response to the traffic on the lane and on the link as a whole. The spare credit register holds the value SPARE_CREDn, indicating the amount of the shared space in buffer 28 that is currently being used by the queue for the nth VL.

Figure 3:
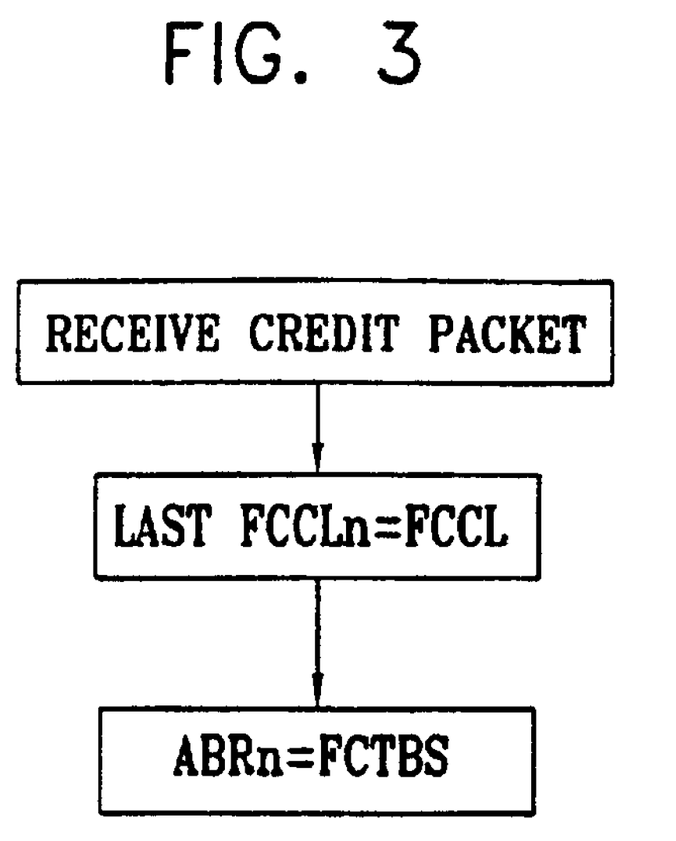
FIG. 3 is a flow chart that schematically illustrates a method for processing credit packets received by a receiver, in accordance with a preferred embodiment of the present invention.

FIG. 3 is a flow chart that schematically illustrates a response of port 24 to credit packet 46 received from entity 27 over link 29, in accordance with a preferred embodiment of the present invention. As noted above, for each of the VLs on link 29, credit packets of this sort are sent periodically from the transmitter of entity 27 to the receiver of port 24, and from the transmitter of port 24 to the receiver of entity 27. Each credit packet sent from entity 27 to port 24, for example, contains the current FCTBS value stored in register 30 at entity 27 for one of the VLs, along with a FCCL value, calculated by the receiver at entity 27, which indicates current credit available at to the transmitter at port 24 on the particular VL.

When the credit packet is received at port 24, the LAST_FCCL value in register 32 for the VL specified by the credit packet is updated to the value of FCCL that is indicated in the credit packet. As noted above, this value is used subsequently by the transmitter in determining whether it has sufficient credits to transmit data packets on the particular VL. In addition, the ABR value in reviser 34 is overwritten with the FCTBS value in the credit packet. In this way, the records of data blocks transmitted and credit available on the particular lane are synchronized between the transmitter in entity 27 and the receiver in port 24.

Figure 4:
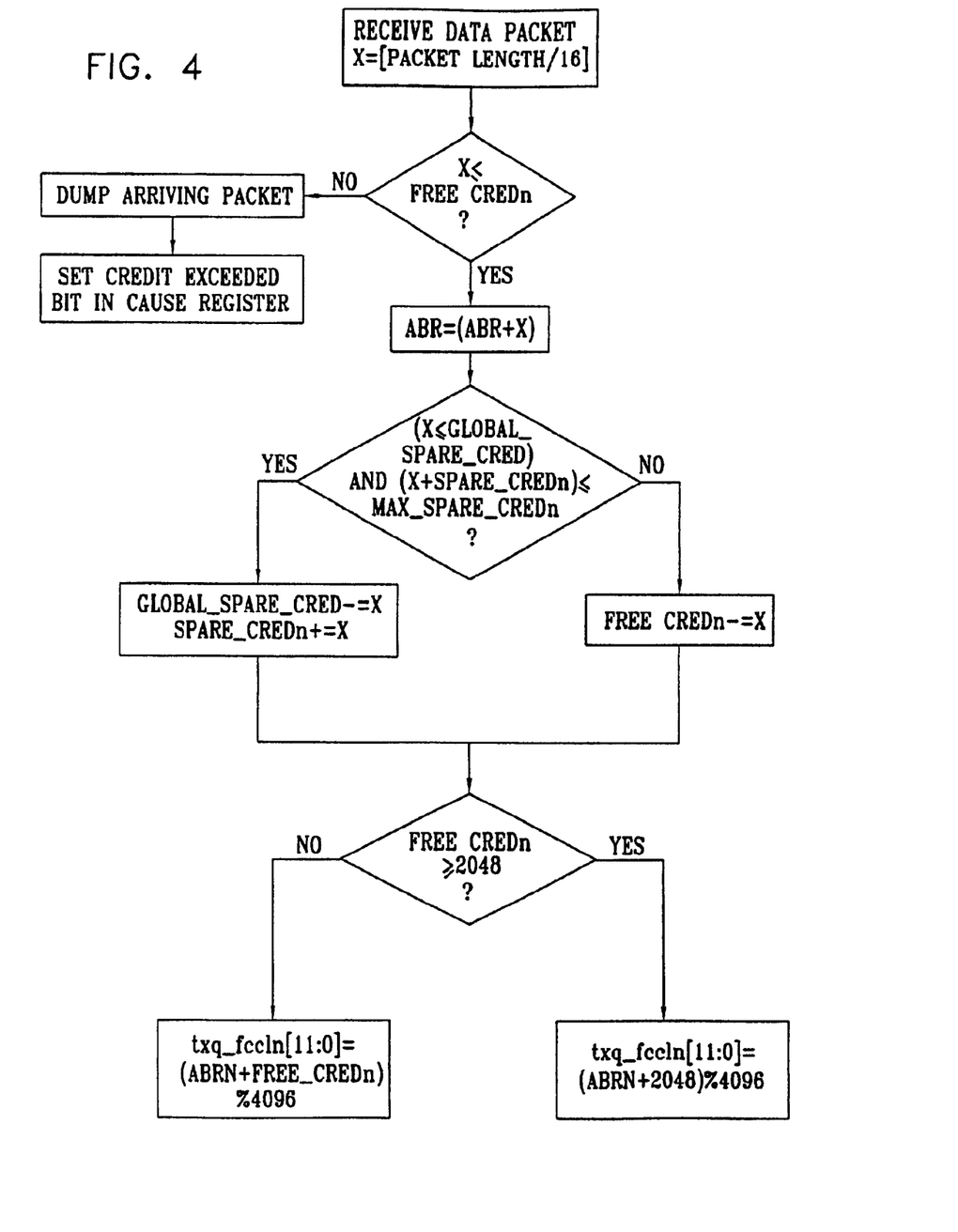
FIG. 4 is a flow chart that schematically illustrates a method for allocating space in a buffer when a data packet arrives at a receiver, in accordance with a preferred embodiment of the present invention.

FIG. 4 is a flow chart that schematically illustrates a response of a receiver (port 24) to a data packet received from a transmitter (entity 27) over link 29, in accordance with a preferred embodiment of the present invention. The response involves a process by which the receiver updates the available credits and, when possible, provides additional credits to the transmitter. The process preferably takes place whenever port 24 receives a new packet. It involves a set of calculations based on the packet size X, in 64-byte blocks, which is defined as the IB packet length/16 (since the IB standard specifies packet length in terms of 32-bit words).

In the event that X is greater than the free credit available for the VL over which the packet arrived, the packet just received is dumped from the buffer. The system of credits used for flow control in IB fabrics is meant to prevent packet loss, so that normally, packet discard should not occur. Therefore, if X does exceed the available credit, it is apparently the result of a fault. In such an event, upon discarding the packet, the receiver preferably sends a management packet or interrupt reporting the fault to a fabric manager or other controller, and sets an appropriate bit in a cause register (not shown) to indicate that a fault has occurred because the transmitter has exceeded its credit limit. The cause register is read by the fabric manager or controller in order to diagnose the fault.

Normally, however, X will be less than or equal to the available free credit for the lane in question. The number held in ABR register 34 for the lane is increased by X. The receiver then checks to determine from where it can allocate additional credit to the transmitter on this lane in order to replace the credit that was used by this packet. The receiver will allocate the additional credits to the lane from the spare credits available in the shared portion of the buffer as long as two conditions are met:

X must be less than the total global spare credit available for buffer 25, as recorded in register 44; and The sum of X added to the amount of spare credit used by this lane, which is read from register 42, must be less than the maximum spare credit allowed for this lane, as recorded in register 38.

When these conditions are met, the number of global spare credits in register 44 is decreased by X, while the number of spare credits used by this lane, recorded in register 42, is increased by X. On the other hand, if either of the above conditions is not satisfied, the additional credit for the lane must be taken from its own static allocation of buffer space. In this case, the free credit available for the lane, as recorded in register 40, is decreased by X.

The receiver now determines the new value of the flow control credit limit (FCCL) for the lane, to be sent to the transmitter at entity 27, based on the remaining free credit recorded in register 40. In accordance with the IB specification, if the number of free credits is greater than or equal to 2048, the FCCL for the lane is set to the current ABR value, read from register 34, plus 2048, in modulo 4096. If the number of free credits is less than 2048, the free credit value itself is added to the ABR value, in modulo 4096. The resulting 12-bit value is identified as the txq_fccl for the lane. It is passed to the transmitter of port 24, which sends the value in the FCCL field of a credit packet to the receiver of entity 27. When this packet reaches entity 27, the transmitter uses the FCCL value as its new LAST_FCCL value for the lane in question, as described above with reference to FIG. 3.

Figure 5:
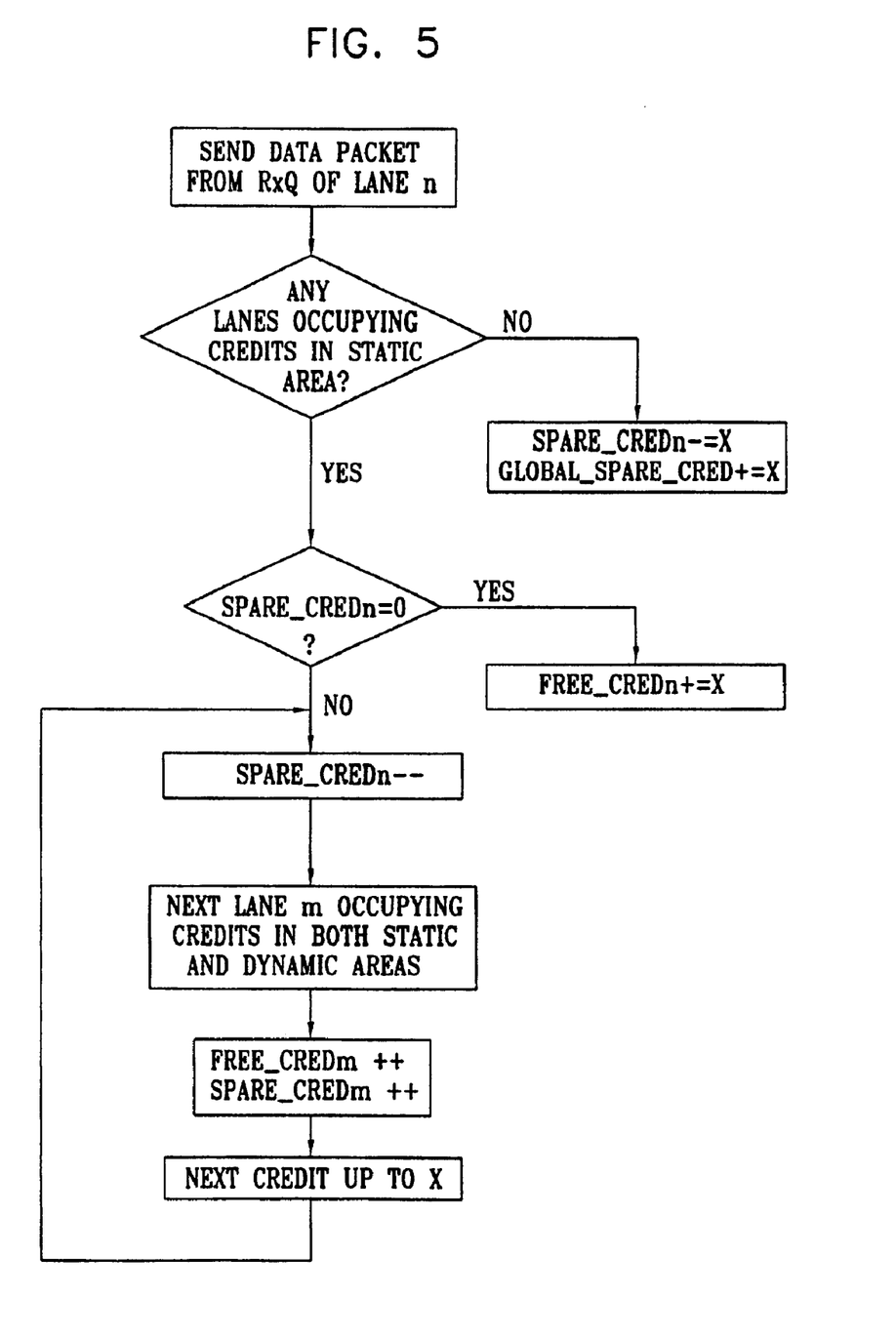
FIG. 5 is a flow chart that schematically illustrates a method for reallocating space in a receive buffer when a data packet passes out of the buffer, in accordance with a preferred embodiment of the present invention.

FIG. 5 is a flow chart that schematically illustrates a method for reallocation of credits in receive queues 28 after a data packet has passed out of buffer 25, in accordance with a preferred embodiment of the present invention. The method is typically invoked whenever port 24 passes a packet from queue 28 to switching core 22 for onward transmission. As in the description of the method of FIG. 4, the packet, of size X, is sent from the receive queue of lane n.

After passing on the packet, the receiver first checks to determine whether any of the receive queues in buffer 25, for any of the VLs served by port 24, currently occupies any part of its assigned static area in the buffer. (This will be the case if FREE_CRED<MAX_CRED for any of the lanes.) If this is not the case, it means that all of the VLs currently have their full allocation of static buffer space available, and the credit used to hold the current packet in buffer 25 must have been taken from the spare (dynamic) portion of the buffer. Now the credit is returned to the shared pool, by decreasing SPARE_CRED for this lane n by an amount equal to X, and increasing GLOBAL_SPARE_CRED by the same amount.

Otherwise, if at least one of the lanes is using its static area, the receiver checks to determine whether lane n is using any part of the dynamic buffer area. If not (i.e., if SPARE_CRED is zero for this lane), then the credit used to hold the current packet must have been taken from the static portion of the buffer that is allocated to lane n. In this case, FREE_CRED for lane n is increased by X.

Finally, if at least one of the lanes is using its static area, and SPARE_CRED≠0 for the present lane n, then the X credits of buffer space that were used to hold the packet just released are redistributed among the lanes whose queues currently occupy space in both their respective static areas and in the shared, dynamic area. (These will be the lanes for which SPARE_CRED≠0 and FREE_CRED<MAX_CRED.) The redistribution is effected in a round robin, whereby the FREE_CRED and SPARE_CRED allocations for each of the participating lanes are incremented in turn until all of the X credits have been distributed.

Although preferred embodiments are described herein with specific reference to an InfiniBand (IB) fabric and the specifications applicable to such a fabric, those skilled in the art will appreciate that the principles of the present invention may also be applied to packet-switching networks of other types having flow control conventions and other network characteristics similar to those of InfiniBand. One of the pertinent network characteristics is the use of an "absolute" credit-based flow control scheme, as described above, in which credits are used to regulate transmission of packets from a transmit buffer while avoiding packet discard at the receiver. A further characteristic of relevance is sharing of the bandwidth of a single physical link by multiple logical data links, served by a common transmitter and receiver. Networks sharing these characteristics are likely to benefit from improved buffer utilization and flow control when the methods of the present invention are used. In the context of the present patent application and in the claims, the term "packets" should therefore be understood to refer not only to IB packets, but also to datagrams of substantially any type and size that may be used in such networks.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for link-level flow control, comprising:

establishing a plurality of logical links over a physical link between a transmitting entity and a receiving entity in a network;

assigning to the logical links respective maximum limits of transmission credits, the credits corresponding to space available to the links in a dynamically allocable portion of a receive buffer at the receiving entity, such that a sum of the maximum limits for all of the logical links corresponds to an amount of space substantially larger than a total volume of the space in the dynamically allocable portion of the receive buffer;

responsive to traffic from the transmitting entity to the receiving entity on a given one of the logical links, allocating one or more of the credits to the given logical link when it is determined that a total of the credits allocated to the given logical link is no greater than the respective maximum limit, and that a total of the credits allocated to all of the logical links together corresponds to an allocated volume that is no greater than the total volume of the space in the dynamically allocable portion of the receive buffer;

controlling transmission of data over the given logical link responsive to the allocated credits; and allocating to the logical links respective static portions of the receive buffer so as to hold, in each of the static portions, only the data received over the respective link, wherein the dynamically allocable portion of the receive buffer comprises the portion of the buffer remaining after allocation of the static portions.

2. A method according to claim 1, wherein allocating the static portions comprises, when it is determined that a total of the credits allocated to the given logical link is greater than the respective maximum limit, or that a total of the credits allocated to all of the logical links together corresponds to an allocated volume that is greater than the total volume of the space in the dynamically allocable portion of the receive buffer, allocating the credits to the given logical link corresponding to the space available in the respective static portion of the receive buffer.

3. A method according claim 2, wherein controlling the transmission of data comprises withholding transmission if the credits allocated are not sufficient to cover an amount of the data that is to be transmitted.

4. A method according to claim 2, and comprising:

receiving the data in the receive buffer responsive to the allocated credits;

passing the data from the receive buffer for onward transmission through the network; and redistributing the allocated credits, after releasing the data; among the logical links having receive queues in the receive buffer that use both the static and dynamically allocable portions of the buffer.

5. A method for link-level flow control, comprising:

establishing a plurality of logical links over a physical link between a transmitting entity and a receiving entity in a network;

assigning to the logical links respective maximum limits of transmission credits, the credits corresponding to space available to the links in a dynamically allocable portion of a receive buffer at the receiving entity, such that a sum of the maximum limits for all of the logical links corresponds to an amount of space substantially larger than a total volume of the space in the dynamically allocable portion of the receive buffer;

responsive to traffic from the transmitting entity to the receiving entity on a given one of the logical links, allocating one or more of the credits to the given logical link when it is determined that a total of the credits allocated to the given logical link is no greater than the respective maximum limit, and that a total of the credits allocated to all of the logical links together corresponds to an allocated volume that is no greater than the total volume of the space in the dynamically allocable portion of the receive buffer; and controlling transmission of data over the given logical link responsive to the allocated credits;

wherein the network comprises a switching fabric that operates in accordance with an InfiniBand specification, and wherein establishing the plurality of logical links comprises establishing virtual lanes in the switching fabric.

6. Network communication apparatus, comprising:

a transmitter, adapted to transmit data; and a receiver, coupled to the transmitter by a physical link in the network and adapted to receive the data from the transmitter over a plurality of logical links established by the transmitter and the receiver over the physical link therebetween, the receiver comprising a receive buffer with respect to which respective maximum limits of transmission credits are assigned to the logical links, the credits corresponding to space available to the links in a dynamically allocable portion of the receive buffer, such that a sum of the maximum limits for all of the logical links corresponds to an amount of space substantially larger than a total volume of the space in the dynamically allocable portion of the receive buffer, the receiver being adapted, responsive to traffic from the transmitting entity to the receiving entity on a given one of the logical links, to allocate one or more of the credits to the given logical link when the receiver determines that a total of the credits allocated to the given logical link is no greater than the respective maximum limit, and that a total of the credits allocated to all of the logical links together corresponds to an allocated volume that is no greater than the total volume of the space in the dynamically allocable portion of the receive buffer, and the transmitter being adapted to control transmission of the data over the given logical link responsive to the allocated credits;

wherein respective static portions of the receive buffer are allocated to the logical links so as to hold, in each of the static portions, only the data received over the respective link, wherein the dynamically allocable portion of the receive buffer comprises the portion of the buffer remaining after allocation of the static portions.

7. Apparatus according to claim 6, wherein the receiver is adapted to allocate the credits to the given logical link corresponding to the space available in the respective static portion of the receive buffer when the receiver determines that a total of the credits allocated to the given logical link is greater than the respective maximum limit, or that a total of the credits allocated to all of the logical links together corresponds to an allocated volume that is greater than the total volume of the space in the dynamically allocable portion of the receive buffer.

8. Network communication apparatus, comprising:

a transmitter, adapted to transmit data; and a receiver, coupled to the transmitter by a physical link in the network and adapted to receive the data from the transmitter over a plurality of logical links established by the transmitter and the receiver over the physical link therebetween, the receiver comprising a receive buffer with respect to which respective maximum limits of transmission credits are assigned to the logical links, the credits corresponding to space available to the links in a dynamically allocable portion of the receive buffer, such that a sum of the maximum limits for all of the logical links corresponds to an amount of space substantially larger than a total volume of the space in the dynamically allocable portion of the receive buffer, the receiver being adapted, responsive to traffic from the transmitting entity to the receiving entity on a given one of the logical links, to allocate one or more of the credits to the given logical link when the receiver determines that a total of the credits allocated to the given logical link is no greater than the respective maximum limit, and that a total of the credits allocated to all of the logical links together corresponds to an allocated volume that is no greater than the total volume of the space in the dynamically allocable portion of the receive buffer, and the transmitter being adapted to control transmission of the data over the given logical link responsive to the allocated credits;

wherein the network comprises a switching fabric that operates in accordance with an InfiniBand specification, and wherein the logical links comprise virtual lanes in the switching fabric.

* * * * *